UNITED STATES PATENT OFFICE.

ADA M. ALBERTY, OF SEATTLE, WASHINGTON.

MILK-MODIFIER.

1,069,096. Specification of Letters Patent. Patented Aug. 5, 1913.

No Drawing. Application filed July 22, 1909. Serial No. 508,916.

*To all whom it may concern:*

Be it known that I, ADA M. ALBERTY, a citizen of the United States, residing at Seattle, in the county of King and State of Washington, have invented certain new and useful Improvements in Milk-Modifiers, of which the following is a specification.

This invention relates to infants' foods; and has for its object the provision of a food preparation to be used with cow's milk as a modifier of the latter's tendency to coagulation when used as human food.

Under natural conditions cow's milk used as food becomes acidulated by the secretions of the stomach and often, especially in the case of infants, forms into dense and continuous curds which resist the normal processes of digestion and become an element of danger to the child's health. Preparations which are designed to overcome this excessive coagulation have heretofore been deleterious to health owing to their action upon milk being chemical in character and tending to interfere with the natural and necessary changes properly taking place in milk under digestive conditions.

My improved modifier of cow's milk consists of a combination of food substances which are formed during the process of manufacture largely into dextrin and soluble starch. After addition to cow's milk and heated a colloidal starch is formed which is not subject to precipitation by the acids of the digestive tract and which interposes a barrier against the formation of continuous, hard clots through the intense coagulation of the casein present in the milk. The coagulum is evenly distributed throughout the liquid, is somewhat granulated or flaky in texture and affords a product readily assimilated by the digestive organs. This action of the modifier is apparently wholly mechanical in its effect and is due to the interposition of the colloids of soluble starch rendering the milk unable to combine into a coagulum hard enough to be injurious to health.

While the same results may be obtained by varying somewhat the materials and methods of manufacture, the preferred manner in which I proceed to carry out my invention is as follows: I bake finely ground white wheaten flour in a moderately heated oven until of a deep brown color, and until the starch therein has as thoroughly as practicable been changed to soluble starch and dextrin. Finely ground and sifted flour made from the whole wheat is then added to the treated white flour in the proportions of two parts of the browned white flour to one part of the whole wheat flour, and to each six parts of the mixture thereof I add one part of finely powdered sugar of milk. This may be prepared and preserved for use in unlimited quantities as it is not subject to rapid deterioration and is usually put up in metal cans. It is prepared for use by adding one part of the modifier just described to ten parts of milk, or milk and water in the proportions proper to the age and condition of the child. It is heated and kept at a temperature of about two hundred degrees Fahrenheit for several minutes whereupon it is cooled and strained for use.

The partially predigested farinaceous and other ingredients of which the food is comprised lend an added food value to the milk by increasing the relative amount of carbohydrates therein.

Having described my invention, what I claim is—

1. A milk modifier adapted when boiled with milk to interpose a barrier to the formation of continuous clots therein when subjected to coagulation consisting of browned white flour, whole wheat flour, and sugar of milk substantially in the proportions specified.

2. A milk modifier adapted when boiled with milk to interpose a barrier to the formation of continuous clots therein when subjected to coagulation, comprising four parts of browned white flour, two parts of whole wheat flour, and one part of sugar of milk.

3. A milk modifier adapted when boiled with milk to interpose a barrier to the formation of continuous clots therein when subjected to coagulation, comprising browned white flour, two parts, and whole wheat flour, one part.

Signed at Seattle, Wash., this 7th day of July, 1909.

ADA M. ALBERTY.

Witnesses:
HORACE BARNES,
M. M. SMITH.

Copies of this patent may be obtained for five cents each, by addressing the "Commissioner of Patents, Washington, D. C."